US010054431B2

(12) United States Patent
Takahashi et al.

(10) Patent No.: US 10,054,431 B2
(45) Date of Patent: Aug. 21, 2018

(54) SHAPE MEASUREMENT APPARATUS AND SHAPE MEASUREMENT METHOD (71) Applicant: OLYMPUS CORPORATION, Hachioji-shi, Tokyo (JP)

(72) Inventors: Yuki Takahashi, Ina (JP); Hiroyuki Seki, Hachioji (JP); Masahiro Uehara, Nagano (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/469,146

(22) Filed: Mar. 24, 2017

(65) Prior Publication Data

US 2017/0199030 A1 Jul. 13, 2017

Related U.S. Application Data (63) Continuation of application No. PCT/JP2015/071997, filed on Aug. 3, 2015.

(30) Foreign Application Priority Data

Oct. 2, 2014 (JP) .................. 2014-203993

(51) Int. Cl.
G01B 11/24 (2006.01)
G01B 11/25 (2006.01)
(52) U.S. Cl.
CPC .................. G01B 11/2518 (2013.01)
(58) Field of Classification Search
CPC ..... G01B 11/2518; G01B 11/24; G01B 11/27; G01B 21/047; G05B 19/401; G05B 2219/37577; G06T 7/579; G01Q 60/366
(Continued)

(56) References Cited

U.S. PATENT DOCUMENTS

2003/0059100 A1* 3/2003 Fleming .................. F16C 11/12
382/141
2007/0268540 A1 11/2007 Gaspardo et al.
(Continued)

FOREIGN PATENT DOCUMENTS

JP 09178439 A 7/1997
JP 2002257511 A 9/2002
WO 2014084131 A1 6/2014

OTHER PUBLICATIONS

International Search Report (ISR) and Written Opinion dated Sep. 1, 2015 issued in International Application No. PCT/JP2015/071997.

Primary Examiner — Isiaka Akanbi
(74) Attorney, Agent, or Firm — Holtz, Holtz & Volek PC (57) ABSTRACT A shape measurement apparatus includes: a holder for holding a measuring object having a spherical measurement surface; a sensor configured to emit light onto the measurement surface to perform non-contact measurement of a distance between the sensor and the measurement surface and output a measured value; a rotation mechanism for rotating the sensor around a first axis; a sensor movement mechanism for moving the sensor along a second axis orthogonal to the first axis so as to be movable across an intersection of the second axis with the first axis; a holder movement mechanism for moving the holder along a vertical direction and on a plane orthogonal to vertical direction; and a control device configured to: calculate the shape of the measurement surface based on the measured value; calculate a spherical center of the measurement surface; and cause the holder movement mechanism to match the spherical center with the intersection.

15 Claims, 9 Drawing Sheets (58) Field of Classification Search
USPC .................................................. 356/601–624
See application file for complete search history.

(56) References Cited

U.S. PATENT DOCUMENTS

| | | |
|---|---|---|
| 2011/0080594 A1 | 4/2011 | Gaspardo et al. |
| 2012/0194651 A1* | 8/2012 | Kanto .................... G01B 11/00 348/50 |
| 2012/0200860 A1 | 8/2012 | Gaspardo et al. |
| 2013/0063731 A1 | 3/2013 | Gaspardo et al. |
| 2014/0293293 A1* | 10/2014 | Vodnick ............... G01B 21/047 356/614 |
| 2015/0260507 A1* | 9/2015 | Aramaki ................ G01B 11/24 700/97 |

* cited by examiner

ILLUMINATION LIGHT

SHAPE MEASUREMENT APPARATUS AND SHAPE MEASUREMENT METHOD

CROSS REFERENCES TO RELATED APPLICATIONS

This application is a continuation of PCT international application Ser. No. PCT/JP2015/071997, filed on Aug. 3, 2015 which designates the United States, incorporated herein by reference, and which claims the benefit of priority from Japanese Patent Application No. 2014-203993, filed on Oct. 2, 2014, incorporated herein by reference.

BACKGROUND

1. Technical Field

The disclosure relates to a shape measurement apparatus and a shape measurement method for performing non-contact measurement of a shape of a curved surface of a component, the curved surface having a spherical shape.

2. Related Art

Examples of a typical spherical component having a spherically curved surface include an optical lens, and a processing plate for processing the optical lens. Conventionally, as a technique of measuring the shape of the curved surface of such a spherical component, there is a known contact type shape measurement technique of performing measurement by allowing a contact type probe to come in contact with a measuring object.

Moreover in recent years, there is a known non-contact type shape measurement technique (for example, refer to JP 9-178439 A and JP 2002-257511 A) of measuring the shape of a measurement surface by measuring a distance to the measurement surface by a distance measurement instrument using light from a laser displacement meter, or the like. The non-contact type shape measurement technique can be used without causing the probe to come in contact with a measuring object. Therefore, it is possible to perform measurement with high accuracy without damaging the measurement surface, or even when the measuring object surface is a rough surface or a discontinuous surface. Furthermore, the non-contact type measurement technique has an advantage of being able to perform measurement in a shorter time compared with conventional contact type measurement techniques.

In the distance measurement instrument using light, distance measurement accuracy might change depending on an illumination angle of illumination light toward a measuring object, that is, inclination of an optical axis of illumination light with respect to a tangent plane on a measurement point. Specifically, the greater the deviation of the illumination angle of the illumination light with respect to the tangent plane from 90°, the lower the measurement accuracy. In order to address such a situation, JP 9-178439 A discloses computational correction of the measurement error due to inclined illumination. Moreover, JP 2002-257511 A sets various stages and a fixture to a relationship based on a fixed algorithm, thereby reducing the reflection angle of the light reflected from a steep surface on an edge portion of the measuring object.

SUMMARY

In some embodiments, provided is a shape measurement apparatus for measuring a shape of a measurement surface of a measuring object, the measurement surface having a spherical shape. The shape measurement apparatus includes: a holder configured to hold the measuring object; a sensor configured to emit light onto the measurement surface to perform non-contact measurement of a distance between the sensor and the measurement surface and output a measured value; a sensor rotation mechanism configured to rotate the sensor around a first axis; a sensor movement mechanism configured to move the sensor along a second axis orthogonal to the first axis so as to be movable across an intersection of the second axis with the first axis; a holder movement mechanism configured to move the holder along a third axis parallel to a vertical direction and configured to move the holder on a plane orthogonal to the third axis; and a control device configured to: calculate the shape of the measurement surface based on the measured value output from the sensor; calculate a spherical center position of the measurement surface; and control the holder movement mechanism so as to match the spherical center position with the intersection of the second axis with the first axis.

In some embodiments, provided is a method for measuring, using a shape measurement apparatus, a shape of a measurement surface of a measuring object, the measurement surface having a spherical shape. The shape measurement apparatus includes: a holder configured to hold the measuring object; a sensor configured to emit light onto the measurement surface to perform non-contact measurement of a distance between the sensor and the measurement surface and output a measured value; a sensor rotation mechanism configured to rotate the sensor around a first axis; a sensor movement mechanism configured to move the sensor along a second axis orthogonal to the first axis so as to be movable across an intersection of the second axis with the first axis; and a holder movement mechanism configured to move the holder along a third axis parallel to a vertical direction and configured to move the holder on a plane orthogonal to the third axis. The method includes: calculating the shape of the measurement surface based on the measured value output from the sensor; calculating a spherical center position of the measurement surface; and causing the holder movement mechanism to match the spherical center position with the intersection of the second axis with the first axis.

The above and other features, advantages and technical and industrial significance of this invention will be better understood by reading the following detailed description of presently preferred embodiments of the invention, when considered in connection with the accompanying drawings.

DETAILED DESCRIPTION

Hereinafter, a shape measurement apparatus and a shape measurement method according to embodiments of the present invention will be described with reference to the drawings. The present invention is not limited by these embodiments. The same reference signs are used to designate the same elements throughout the drawings. The drawings are only schematic, and dimensional relations and ratios between elements are different from actual cases. Dimensional relations and ratios between the elements in different drawings may also be different from one another.

Embodiments

Figure 1:
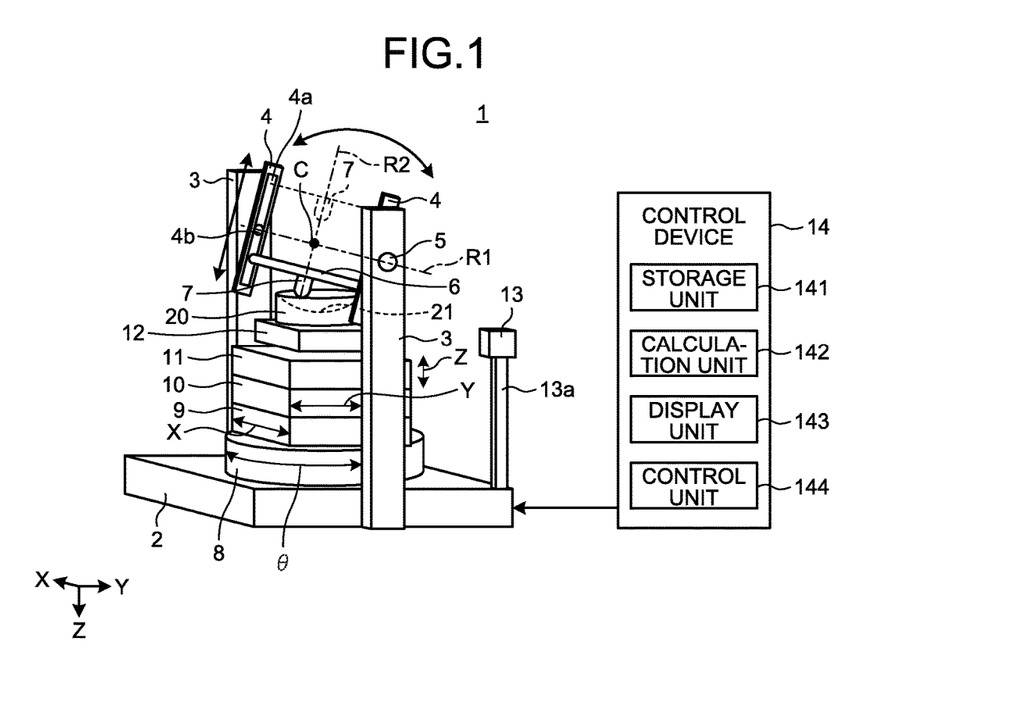
FIG. 1 is a schematic diagram illustrating an exemplary configuration of a shape measurement apparatus according to an embodiment of the present invention.

FIG. 1 is a schematic diagram illustrating an exemplary configuration of a shape measurement apparatus according to an embodiment of the present invention. As illustrated in FIG. 1, a shape measurement apparatus 1 according to the embodiments is a shape measurement apparatus configured to measure the shape of a measurement surface of a measuring object including the measurement surface having a protruding or recessed spherical shape, and more particularly, configured to measure shape deviation in a radial direction on each point on the measurement surface. The shape measurement apparatus 1 includes a base 2, two support members 3, two slide rails 4, a bar 6, a sensor 7, a θ-stage 8, an X-stage 9, a Y-stage 10, a Z-stage 11, a holder 12, a temperature measurement instrument 13, and a control device 14. The two support members 3 are fixed onto the base 2. The two slide rails 4 are rotatably attached to the support members 3 via an encoder 5. The bar 6 is slidable along a rail unit 4a provided onto the slide rail 4. The sensor 7 is fixed onto the bar 6. The θ-stage 8 is provided on the base 2, being rotatable within a horizontal plane. The X-stage 9, the Y-stage 10, and the Z-stage 11 are provided on the θ-stage 8. The holder 12 holds a measuring object 20 on the Z-stage 11. The temperature measurement instrument 13 is provided on the base 2 via a leg portion 13a and measures ambient temperature. The control device 14 controls entire operation of the shape measurement apparatus 1. Hereinafter, a vertical direction is determined to be the Z-direction, and a horizontal plane orthogonal to the Z-direction is determined to be an X-Y plane.

The measuring object 20 is a member having a measurement surface 21 including a protruding or recessed spherical shape on at least a portion of the surface, such as an optical lens, and a polishing tool for polishing the optical lens. Although in FIG. 1, the measurement surface 21, i.e., the upper surface of the measuring object 20, has a recessed shape and the lower surface of the measuring object 20 is flat, the shape of the measuring object 20 is not particularly limited as long as at least the measurement surface 21 has a spherical shape. Moreover, a surface state of the measurement surface 21 may be a rough surface or a polished surface.

The sensor 7 is a non-contact measurement instrument configured to emit light onto the measurement surface 21 of the measuring object 20, thereby measuring the distance to the measurement surface 21 and outputting a measured value. The embodiments employ, as the sensor 7, a laser displacement meter configured to measure the distance using the triangulation method. Another distance measuring instrument using other methods instead of the triangulation method may be employed as the sensor 7, such as an interference spectroscopy sensor. The distance information (measured value) between the sensor 7 and the measuring object 20 measured by the sensor 7 is output to the control device 14.

The two slide rails 4 are arranged to be parallel with each other, 360° rotatably around a center axis R1 (first axis) of the encoder 5. The encoder 5 is a sensor rotation mechanism configured to rotate the sensor 7 around the center axis R1, via the slide rail 4. Additionally, the slide rail 4 and the bar 6 constitute a sensor movement mechanism configured to move the sensor 7 on an axis R2 (second axis) orthogonal to the center axis R1. An intersection of the axis R2, that is, a path on which the sensor 7 is movable, and the center axis R1, is determined as a rotational center C of the sensor 7.

The bar 6 and the sensor 7 are movable along the axis R2 across the rotational center C. The position of the bar 6 on the rail unit 4a, that is, the position of the sensor 7 on the axis R2 is adjusted in accordance with the global shape of the measurement surface 21. Specifically, in a case where the global shape of the measurement surface 21 is a recessed spherical shape, the bar 6 is arranged at a lower side of a fulcrum 4b, that is, at a side close to the measurement surface 21. In a case where the global shape of the measurement surface 21 is a protruding spherical shape, the bar 6 is arranged at an upper side of the fulcrum 4b, that is, at a side away from the measurement surface 21.

A drive apparatus is provided for the slide rail 4 and the bar 6. Rotational movement of the slide rail 4 and sliding of the bar 6 on the slide rail 4 are automatically controlled by the control device 14 via the drive apparatus. Alternatively, the rotational movement of the slide rail 4 and sliding of the bar 6 on the slide rail 4 may be manually controlled by a user. The amount of rotational movement of the encoder 5 and the amount of straight movement of the bar 6 on the slide rail 4 (distance from the fulcrum 4b, and movement direction) are output to the control device 14.

The θ-stage 8 is a holder rotation mechanism that rotates around an axis parallel to the Z-direction and thereby changes the direction of the holder 12 with respect to the bar 6, namely, the relative direction of the measuring object 20. The X-stage 9, the Y-stage 10, and the Z-stage 11 constitute a holder movement mechanism that adjusts a three-dimensional position of the holder 12, namely, the measuring object 20, by translating in each of X, Y, and Z directions on the θ-stage 8. Each of the θ-stage 8, the X-stage 9, the Y-stage 10, and the Z-stage 11 includes a drive apparatus. The rotational movement of the θ-stage 8 and translational movement of the X-stage 9, the Y-stage 10, and the Z-stage 11 in each of directions are automatically controlled by the control device 14, via the drive apparatus. Alternatively, the rotational movement of the θ-stage 8 and translational movement in each direction of the X-stage 9, the Y-stage 10, and the Z-stage 11 may be manually controlled by the user.

The control device 14 is constituted by a personal computer, for example, and controls entire operation of the shape measurement apparatus 1. Specifically, the control device 14 includes a storage unit 141, a calculation unit 142, a display unit 143, and a control unit 144. The storage unit 141 stores a control program of the control device 14 and various types of information. The calculation unit 142 calculates the shape of the measurement surface 21. The display unit 143 displays the calculated shape of the measurement surface 21. The control unit 144 performs overall control of operations of the elements.

The control unit 144 controls a series of operation including adjustment of the position of the bar 6 on the slide rail 4, and positions of the θ-stage 8, the X-stage 9, the Y-stage 10, and the Z-stage 11 such that the spherical center of the measurement surface 21 matches the rotational center C of the sensor 7, and measurement of the shape of the measurement surface 21.

Specifically, laser light is emitted from the sensor 7 onto the measurement surface 21 as illumination light, and the light reflected from the measurement surface 21 is detected. With this operation, the distance from the sensor 7 to the measurement surface 21 is measured, and the shape of the measurement surface 21, that is, minute recesses and protrusions, and shape errors from the true sphere are measured on the basis of this measured distance. As described above, spherical center of the measurement surface 21 is set so as to match with the rotational center C of the sensor 7. Accordingly, by rotating the slide rail 4 and the θ-stage 8, it is possible to vertically emit the illumination light from the sensor 7 to the tangent plane on each of points on the measurement surface 21, as well as to maintain the distance from the sensor 7 to each of the points on the measurement surface 21 to a fixed distance. Accordingly, it is possible to perform high-accuracy shape measurement on entire regions of the measurement surface 21 by eliminating unique errors on the sensor 7, specifically, errors due to illumination angle of the illumination light toward the measurement surface 21, and errors due to the difference in the measurement distance to the measurement surface 21. Hereinafter, the error due to the illumination angle of the illumination light will be referred to as an angular characteristic error. Moreover, an error due to the difference in the measurement distance is referred to as a straightness error.

As described above, when the measurement surface 21 is a true sphere, it is possible to perform shape measurement that eliminates angular characteristic errors and straightness errors. However, in a case where the measurement surface 21 is far from a true sphere due to waves or the like, effects of these errors would be reflected on a measurement result of the sensor 7. Moreover, depending on the environment in which the shape measurement apparatus 1 is disposed, temperature characteristic errors may occur due to temperature change. In order to address such a situation, in the embodiments, each error component of the angular characteristic error, the straightness error, and the temperature characteristic error on the sensor 7 is evaluated beforehand and stored in the storage unit 141, and correction on the measured values output from the sensor 7 is performed using correction data based on these error components, which makes it possible to achieve high-accuracy shape measurement.

Hereinafter, the error components stored in the storage unit 141 will be described with reference to FIGS. 2 to 4. Note that various error components described below are unique components individually included in the laser displacement meter used as the sensor 7, and thus, after once obtained and stored in the storage unit 141, the error components need not be re-obtained until calibration of the sensor 7.

Figure 2:
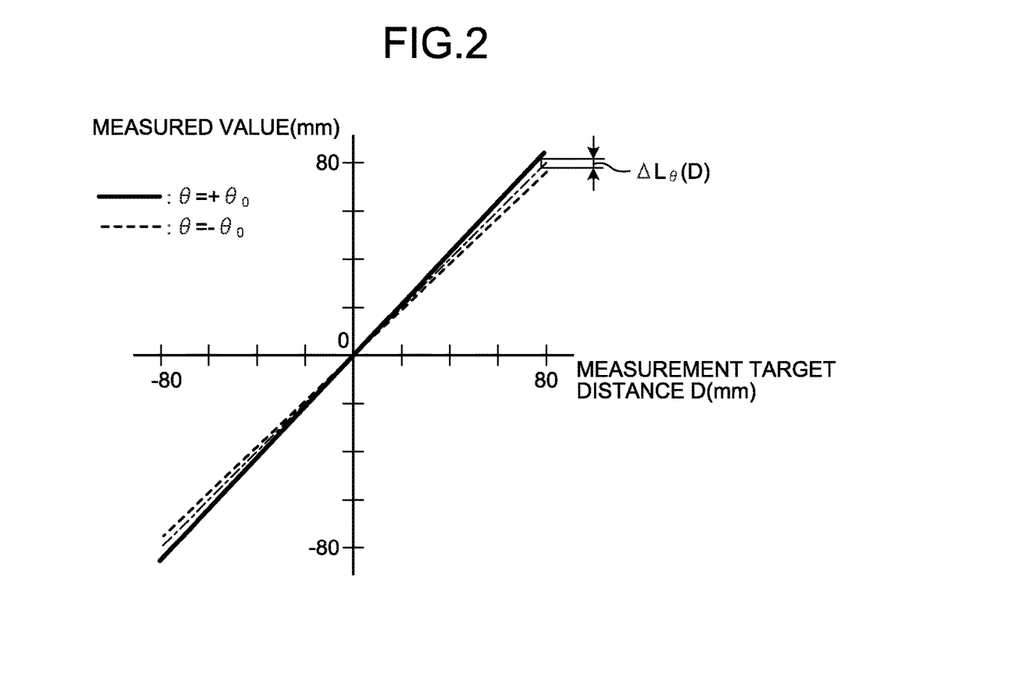
FIG. 2 is a graph illustrating an exemplary angular characteristic error on a sensor illustrated in FIG. 1.

FIG. 2 is a graph illustrating an exemplary angular characteristic error on the sensor 7. In a case where the illumination light emitted from the sensor 7 is inclined with respect to a normal on the tangent plane on the illumination point on the measurement surface 21, the optical path of the illumination light and the optical path of the reflected light do not match with each other. In this case, the measured value on the sensor 7 would have an error that increases with the growth of a measurement target distance D. This error is an angular characteristic error $\Delta L_\theta(D)$. Herein, an angle θ represents an angle of the optical axis of the illumination light with respect to the normal of the tangent plane on the illumination point. Note the solid line illustrated in FIG. 2 indicates an angular characteristic error $\Delta L_\theta(D)$ when $\theta=+\theta_0$ is true, and the broken line indicates an angular characteristic error $\Delta L_\theta(D)$ when $\theta=-\theta_0$ is true. The angular characteristic error $\Delta L_\theta(D)$ like this can be actually measured by inclining the illumination light with respect to the tangent plane on the illumination point. The angle formed between the normal of the tangent plane and the optical axis of the illumination light can be adjusted by controlling the amount of rotation of the encoder 5 and the amount of rotation of the θ-stage 8. The storage unit 141 stores the angular characteristic error $\Delta L_\theta(D)$ measured in this manner for each of angles $\theta(-90°<\theta<90°)$.

Figure 3:
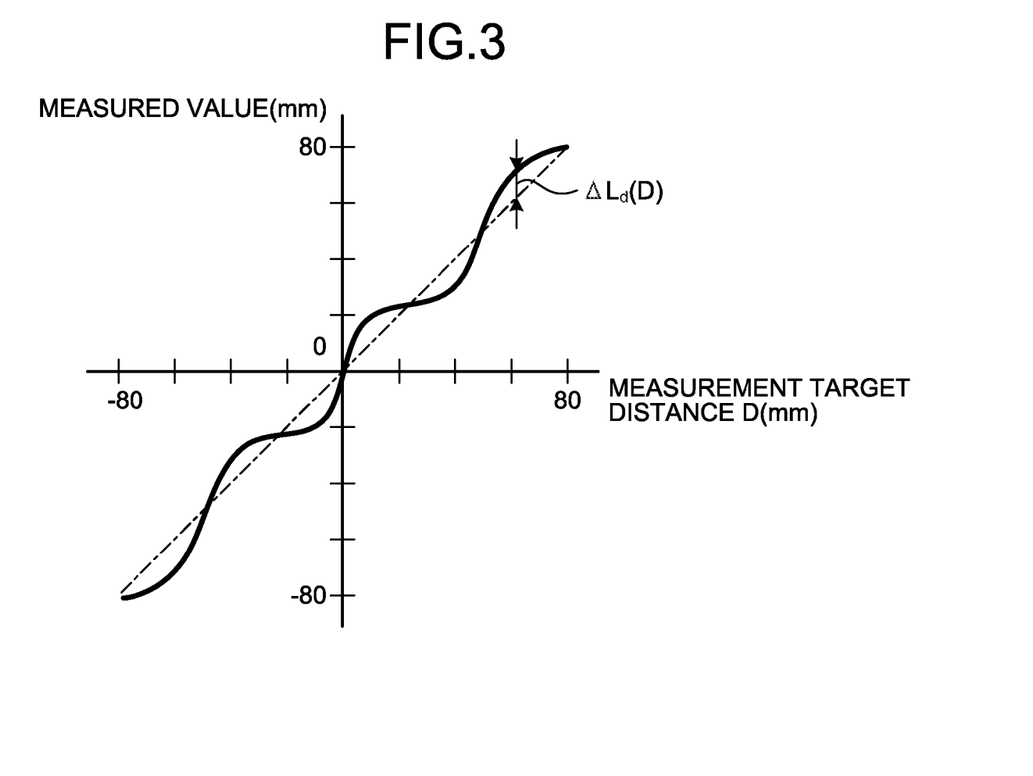
FIG. 3 is a graph illustrating an exemplary straightness error on the sensor illustrated in FIG. 1.

FIG. 3 is a graph illustrating an exemplary straightness error on the sensor 7. If there is no angular characteristic error, a change made to the measurement target distance to the measurement surface 21, that is, a change made to the distance between the sensor 7 and each point on the measurement surface 21, would produce an error between the measurement target distance and the measured value on the sensor 7. This error is a straightness error $\Delta L_d(D)$. The straightness error $\Delta L_d(D)$ can be obtained from the measured value by the sensor 7 for each of the measurement target distances. The storage unit 141 stores the straightness error $\Delta L_d(D)$ obtained in this manner.

Figure 4:
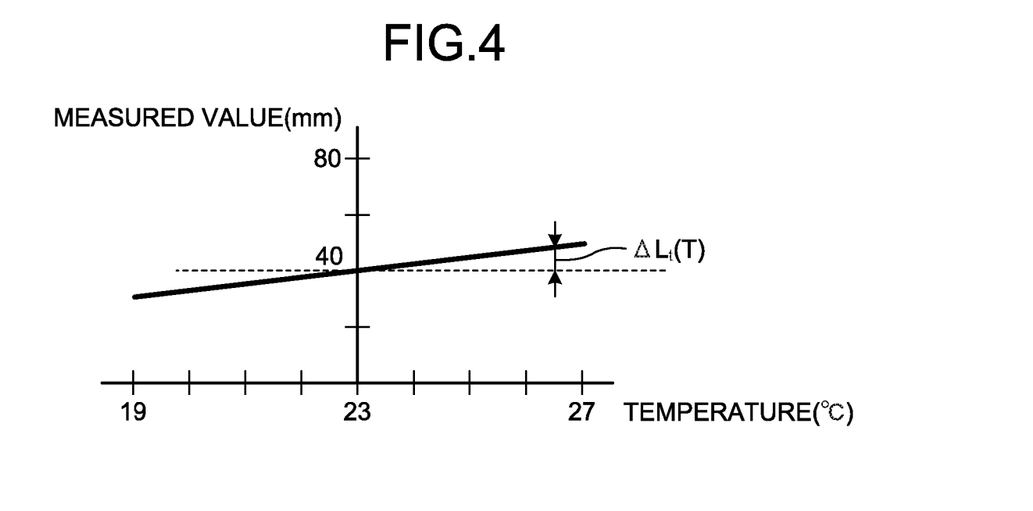
FIG. 4 is a graph illustrating an exemplary temperature characteristic error on the sensor illustrated in FIG. 1.

FIG. 4 is a graph illustrating an exemplary temperature characteristic error on the sensor 7. When the temperature environment is changed without changing the positional relationship between the sensor 7 and the measurement surface 21 without the angular characteristic error, an error occurs between the measurement target distance and the measured value by the sensor 7. This error is a temperature characteristic error $\Delta L_t(T)$. The solid line illustrated in FIG. 4 indicates a measured value by the sensor 7 when the measurement target distance is maintained at 40 mm and the temperature is changed within a range of 23°±4°. The storage unit 141 stores the temperature characteristic error $\Delta L_t(T)$ actually measured for each of the measurement target distances.

Figure 5:
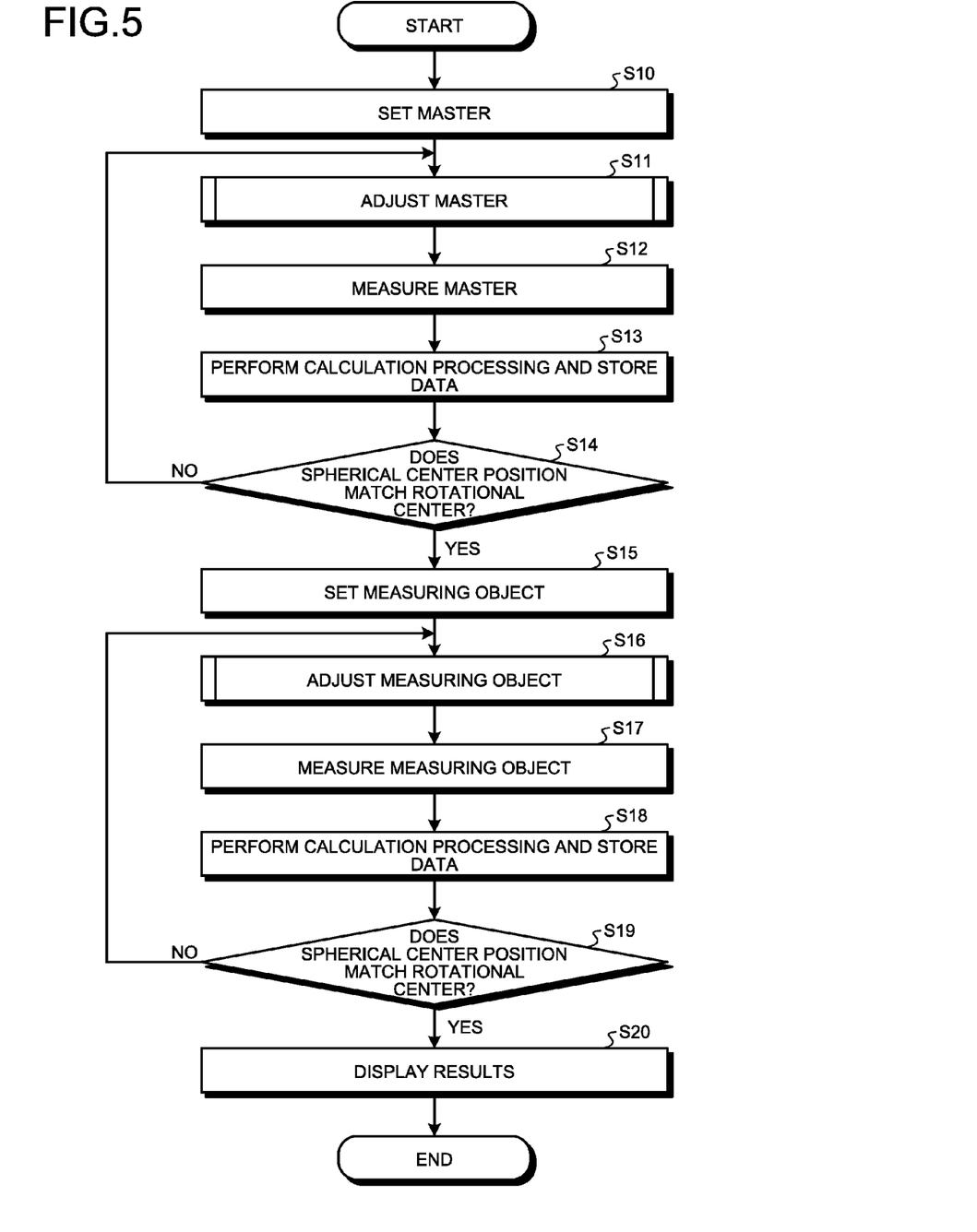
FIG. 5 is a flowchart illustrating a shape measurement method using a shape measurement apparatus illustrated in FIG. 1.

Next, a shape measurement method using the shape measurement apparatus 1 illustrated in FIG. 1 will be described. FIG. 5 is a flowchart illustrating the shape measurement method using the shape measurement apparatus 1.

First, in step S10, a master that includes a measurement surface with a true spherical shape is set on the holder 12. Hereinafter, although the measurement surface of the master has a protruding spherical shape, each step can be similarly executed even if the surface has a recessed spherical shape.

Figure 6:
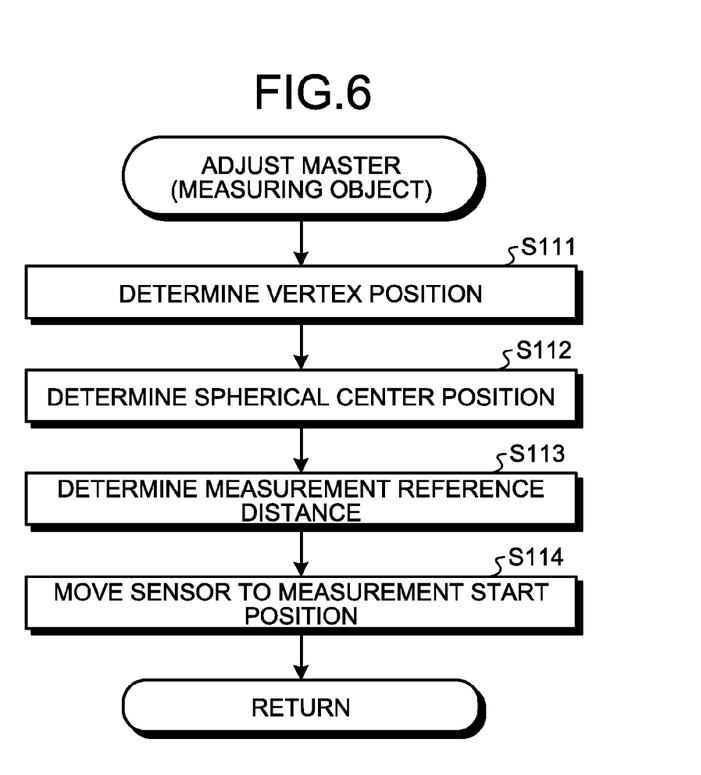
FIG. 6 is a flowchart illustrating a method for adjusting a master (measuring object) illustrated in FIG. 5.

In subsequent step S11, various types of master adjustments are performed. FIG. 6 is a flowchart illustrating a method for adjusting the master.

In step S111, the position of vertex of the master is determined by adjusting the θ-stage 8, the X-stage 9, the Y-stage 10, and the Z-stage 11 using automatic control by the control device 14 or user's manual control.

In subsequent step S112, a spherical center position of the master is determined by adjusting the Z-stage 11 such that the spherical center of the master matches the rotational center C of the sensor 7 using automatic control by the control device 14 or user's manual control.

In step S113, a measurement reference distance, that is, a distance between the sensor 7 and the vertex of the master, set onto each of the sensor 7, is determined by adjusting the position of the bar 6 on the slide rail 4 using automatic control by the control device 14 or user's manual control.

In step S114, the encoder 5 is rotated to move the sensor 7 to a measurement start position using automatic control by the control device 14 or user's manual control. Thereafter, the processing returns to the main routine.

In step S12 subsequent to step S11, the measurement surface of the master is measured by rotating the slide rail 4 via the encoder 5 using automatic control by the control device 14, and rotating the sensor 7 around the center axis R1 from the measurement start position to the measurement finish position, while rotating the θ-stage 8 synchronously.

Figure 7:
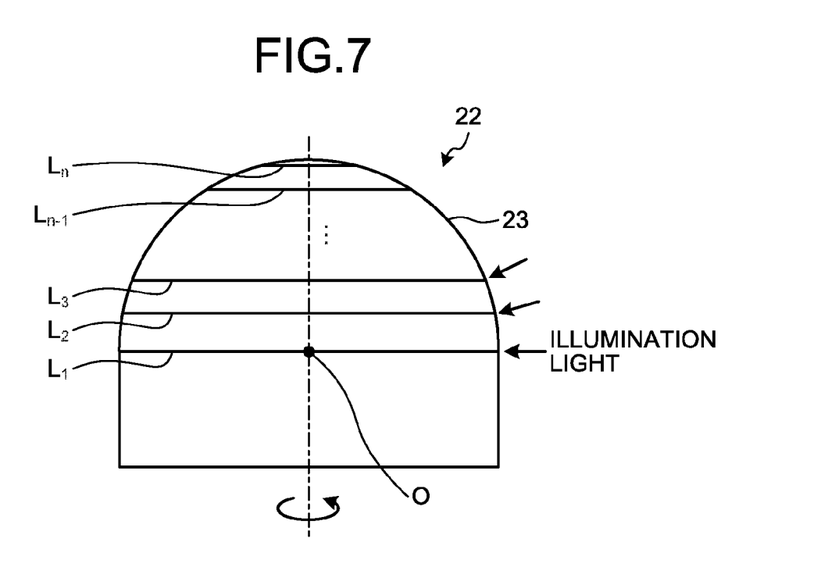
FIG. 7 is a schematic diagram for illustrating a first example of a measurement surface measurement method.

The measurement surface may be measured with the following two exemplary measurement methods. FIG. 7 is a schematic diagram for illustrating a first example of the measurement surface measurement method. As illustrated in FIG. 7, a circumference $L_1$ is scanned by rotating the θ-stage 8 by one rotation in a state where illumination light is emitted onto a point on the circumference $L_1$ of a measurement surface 23 of a master 22. Subsequently, the encoder 5 is rotated to shift the illumination point of the illumination light, and the circumference $L_2$ is scanned by rotating the θ-stage 8 by one rotation in a state where the illumination light is emitted onto a point of the circumference $L_2$. Similarly, it is possible to measure the distance between each of the points on each of circumferences $L_1$ to $L_n$ and the sensor 7 by repeating scanning by illumination light toward the circumferences $L_3$ to $L_n$.

Figure 8:
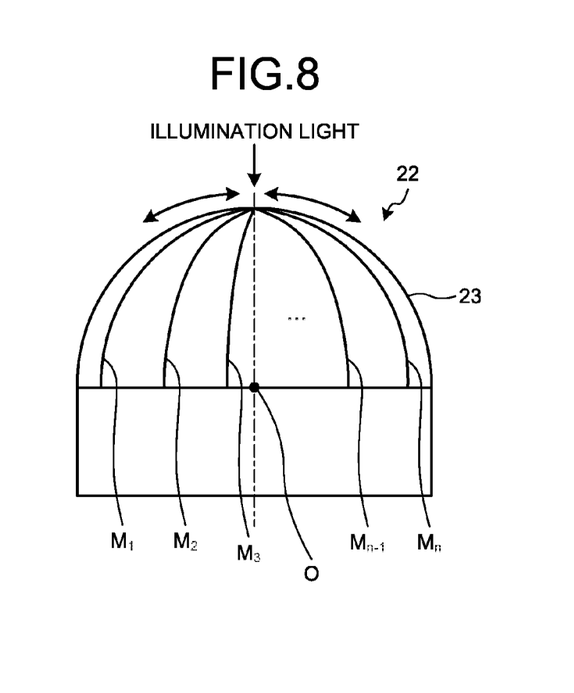
FIG. 8 is a schematic diagram for illustrating a second example of the measurement surface measurement method.

FIG. 8 is a schematic diagram for illustrating a second example of the measurement surface measurement method. As illustrated in FIG. 8, a semi-circumference $M_1$ is scanned by rotating the encoder 5 in a state where illumination light is emitted onto a point on the semi-circumference $M_1$ of the measurement surface 23 of the master 22. Subsequently, the θ-stage 8 is rotated to shift the illumination point of the illumination light, and the semi-circumference $M_2$ is scanned by rotating the encoder 5 in a state where the illumination light is emitted onto a point of the semi-circumference $M_2$. Similarly, it is possible to measure the distance between the points on each of semi-circumferences $M_1$ to $M_n$ and the sensor 7 by repeating scanning by illumination light toward the semi-circumferences $M_3$ to $M_n$.

In step S13, the calculation unit 142 retrieves a measured value output from the sensor 7, the amount of rotation of the encoder 5, the amount of rotation of the θ-stage 8, and a temperature measured value output from the temperature measurement instrument 13, corrects the measured value for the measurement surface 23 to calculate the shape of the measurement surface 23, and stores calculation result data into the storage unit 141.

More specifically, the calculation unit 142 performs correction on the measured value of the master output from the sensor 7, including elimination of the angular characteristic error, the straightness error, and the temperature characteristic error. Hereinafter, the correction method will be described in detail. FIGS. 9 to 13 are graphs for illustrating a method for correcting measured values of the master.

Figure 9:
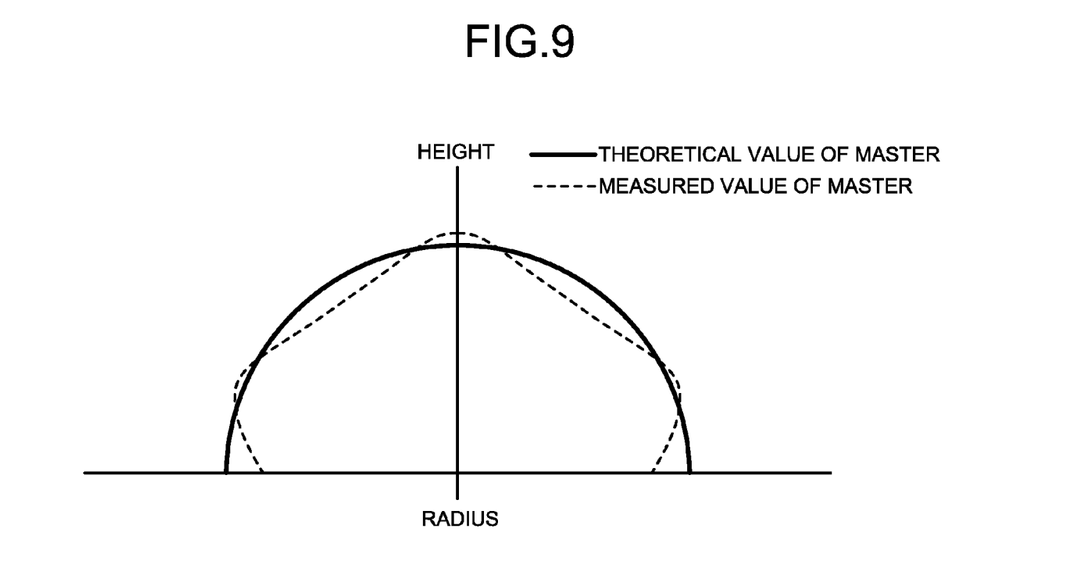
FIG. 9 is a graph for illustrating a method for correcting a measured value of the master.

In FIG. 9, the solid line indicates a theoretical value, and the broken line indicates a measured value, of the shape of the measurement surface 23 of the master 22. The measurement surface 23 of the master 22 has a true spherical shape produced in accuracy higher than target measurement accuracy. Accordingly, the difference between the theoretical value and the measured value illustrated in FIG. 9 can be considered as a measurement error in the shape measurement apparatus, that is, an assembly error, an angular characteristic error, a straightness error, and a temperature characteristic error.

Figure 10:
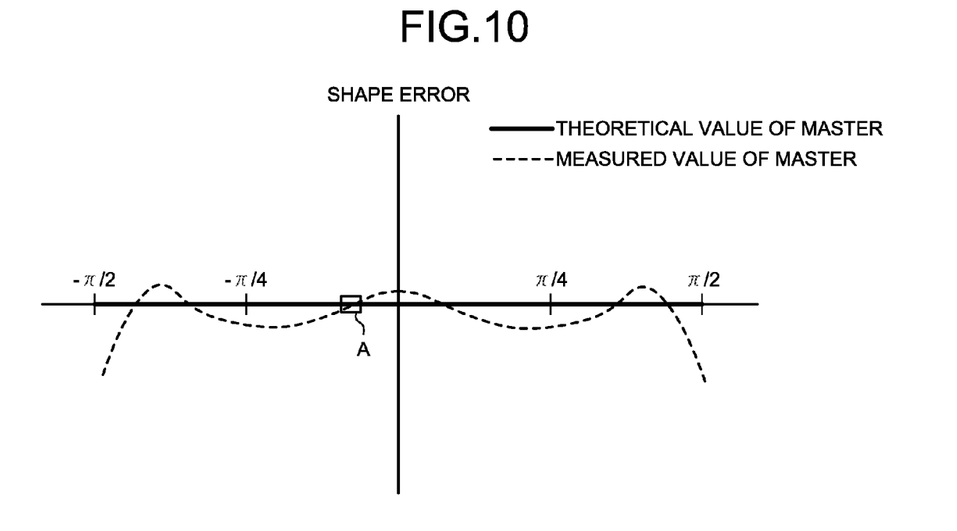
FIG. 10 is a graph for illustrating a method for correcting a measured value of the master.
Figure 11:
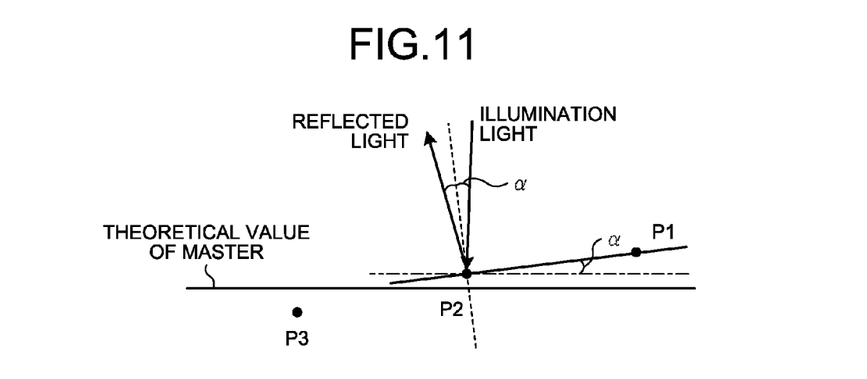
FIG. 11 is a graph for illustrating a method for correcting a measured value of the master.

FIGS. 10 and 11 are diagrams for illustrating methods for correcting angular characteristic errors. FIG. 10 is a graph illustrating a difference between the measured value of the shape of the master and the theoretical value of the shape of the master. That is, assuming that the theoretical value of the master is a straight line, the graph indicates a corresponding value of the measured value of the master. FIG. 11 is a schematic diagram illustrating enlarged arbitrary illumination points P1 to P3 included in a region A illustrated in FIG. 10.

As illustrated in FIG. 11, inclination (angle α) of the optical axis of the illumination light with respect to the normal of the measurement surface is given by the following formula (1) using coordinate values of adjoining illumination points P1 ($P1_x$, $P1_y$) and P2 ($P2_x$, $P2_y$).

$$\alpha = \arctan \frac{(P1_y - P2_y)}{P1_x - P2_x} \quad (1)$$

The calculation unit 142 obtains an angular characteristic error $\Delta L_\alpha(D)$ (refer to FIG. 2) corresponding to the angle α from the angular characteristic error $\Delta L_\theta(D)$ stored in the storage unit 141 beforehand, and performs correction by subtracting this angular characteristic error $\Delta L_\alpha(D)$ from the measured value on the master.

Figure 12:
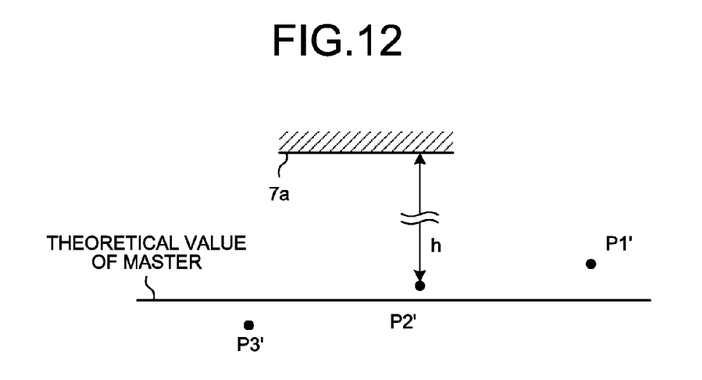
FIG. 12 is a graph for illustrating a method for correcting a measured value of the master.

FIG. 12 is a diagram for illustrating a method for correcting straightness errors and temperature characteristic errors. In this diagram, each of illumination points P1', P2', and P3' represents a position on which the angular characteristic error has been corrected for each of the illumination points P1, P2, and P3, illustrated in FIG. 11. In correcting the straightness error, the calculation unit 142 calculates a distance h from the illumination point P2' to a surface 7a of the sensor 7, and obtains a straightness error $\Delta L_d(h)$ corresponding to the distance h, from the straightness error $\Delta L_d(D)$ stored in the storage unit 141 beforehand, as illustrated in FIG. 12. Then, correction is performed by subtracting this straightness error $\Delta L_d(h)$ from the measured value of the master after correction of the angular characteristic error.

Moreover, in correcting the temperature characteristic error, the calculation unit 142 obtains a temperature characteristic error $\Delta L_t(T_0)$ corresponding to the temperature measured value, from the temperature characteristic error $\Delta L_t(T)$ stored beforehand in the storage unit 141, on the basis of the temperature measured value $T_0$ output from temperature measurement instrument 13. Then, correction is performed by subtracting this temperature characteristic error $\Delta L_t(T_0)$ from the measured value of the master after correction for the straightness error.

Figure 13:
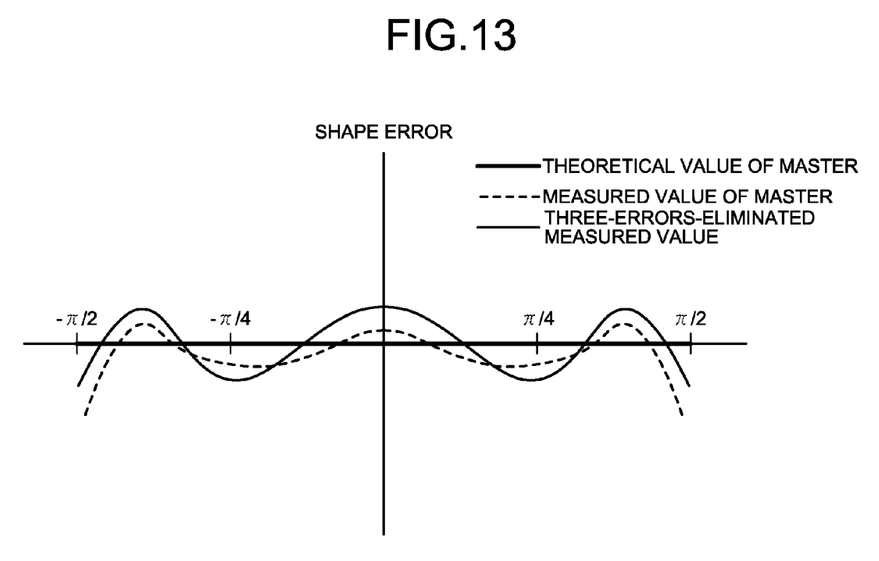
FIG. 13 is a graph for illustrating a method for correcting a measured value of the master.

In this manner, the difference between the theoretical value of the master and the measured value obtained by eliminating the angular characteristic error, the straightness error, and the temperature characteristic error from the measured value by the sensor 7, i.e., the three-errors-eliminated measured value, would be the assembly error on the shape measurement apparatus 1 (refer to FIG. 13). The calculation unit 142 stores the assembly error data calculated in this manner, into the storage unit 141.

In step S14 subsequent to step S13, the control unit 144 determines whether a spherical center position O of the measurement surface 23 matches the rotational center C (refer to FIG. 1) of the sensor 7 on the basis of the shape of the measurement surface 23 calculated in step S13.

In a case where the spherical center position O of the measurement surface 23 does not match the rotational center C of the sensor 7 (step S14: No), processing returns to step S11 and repeats adjustment of the master.

In contrast, in a case where the spherical center position O of the measurement surface 23 matches the rotational center C of the sensor 7 (step S14: Yes), the master 22 is removed from the holder 12 and the measuring object is set on the holder 12 (step S15). The measured value of the master 22 in a state where the spherical center position O of the master 22 matches the rotational center C of the sensor 7 is determined as a reference value to be used in measurement of measuring objects.

In subsequent step S16, various types of adjustment of the measuring object is performed. Method for adjusting the measuring object is similar to step S11 (refer to FIG. 6).

In step S17, the measurement surface of the measuring object is measured with automatic control by the control device 14. The method for measuring the measurement surface of the measuring object is similar to step S12.

In Step S18, a measured value output from the sensor 7, the amount of rotation of the encoder 5, the amount of rotation of the θ-stage 8, and a temperature measured value output from the temperature measurement instrument 13 are retrieved, the measured value for the measurement surface of the measuring object is corrected to calculate the shape of the measurement surface, and the calculation result data is stored into the storage unit 141.

Figure 14:
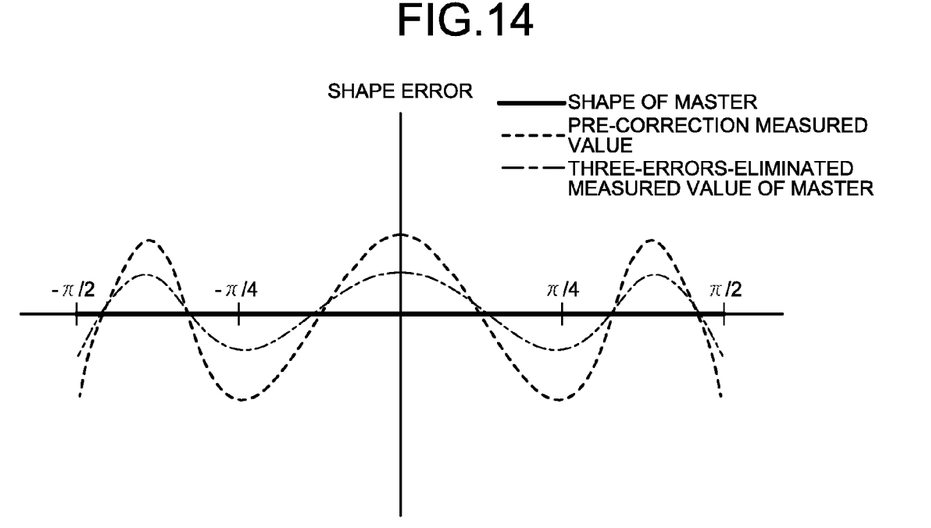
FIG. 14 is a graph for illustrating a method for correcting a measured value of a measuring object.
Figure 15:
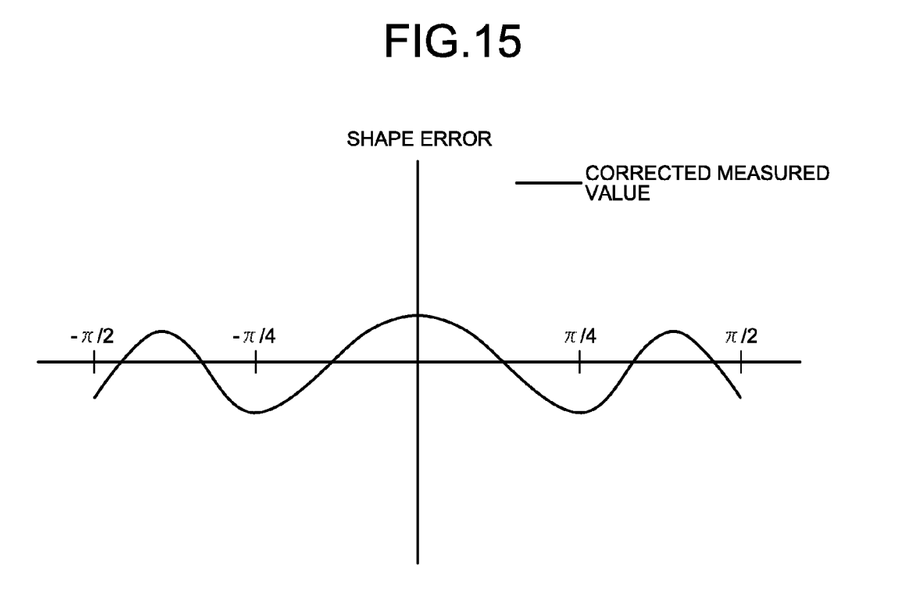
FIG. 15 is a graph for illustrating a method for correcting a measured value of a measuring object.

Specifically, the calculation unit 142 performs error correction on the measured value of the measurement surface of the measuring object. FIGS. 14 and 15 are graphs for illustrating a method for correcting an error of a measured value of the measuring object.

First, as illustrated in FIG. 14, the calculation unit 142 performs correction for an assembly error on the shape measurement apparatus 1 by subtracting three-errors-eliminated measured value of the master calculated in step S13, from a pre-correction measured value as the measured value of the measuring object output from the sensor 7. With this correction, it is possible, as illustrated in FIG. 15, to obtain a corrected measured value as the measured value of the measuring object from which the assembly error has been eliminated.

Subsequently, the calculation unit 142 performs correction for the angular characteristic error, the straightness error, and the temperature characteristic error, on the corrected measured value of the measuring object, using the amount of rotation of the encoder 5, the amount of rotation of the θ-stage 8, and the temperature measured value output from the temperature measurement instrument 13. The method for correcting the angular characteristic error, the straightness error, and the temperature characteristic error, is similar to step S13.

The calculation unit 142 calculates the shape of the measurement surface of the measuring object based on the measured value corrected in this manner, and stores data indicating the shape, into the storage unit 141.

In subsequent step S19, the control unit 144 determines whether the spherical center position of the measurement surface matches the rotational center C (refer to FIG. 1) of the sensor 7 on the basis of the shape of the measurement surface calculated in step S18.

In a case where the spherical center position of the measurement surface does not match the rotational center C of the sensor 7 (step S19: No), processing returns to step S16 and repeats adjustment of the measuring object.

In contrast, in a case where the spherical center position of the measurement surface matches the rotational center C of the sensor 7 (step S19: Yes), the control unit 144 outputs data indicating the shape of the measurement surface calculated in step S18 onto the display unit 143 so as to display the shape (step S20). Thereafter, the shape measurement method on the shape measurement apparatus 1 is finished.

As described above, according to the embodiments of the present invention, the sensor 7 is configured to be movable along the rail unit 4*a* of the slide rail 4, and the sensor 7 is rotated in a state where the spherical center position of the measurement surface is matched with the rotational center C of the sensor 7. With this configuration, it is possible to perform measurement while maintaining the illumination angle of the illumination light substantially perpendicular to the measurement surface and maintaining the measurement distance at a substantially fixed distance even when the measurement surface of the measuring object has a protruding or recessed shape, and regardless of the radius of curvature. Accordingly, it is possible to reduce the angular characteristic error and the straightness error included in the measured value to an extremely small level.

Moreover, according to the above-described embodiments, it is possible to further enhance measurement accuracy of the shape of the measurement surface of the measuring object by eliminating, with calculation processing, the angular characteristic error, the straightness error, and the temperature characteristic error, generated by minute waves on the measurement surface.

Moreover, according to the above-described embodiments, an assembly error on the shape measurement apparatus 1 is calculated by performing measurement using the master having a measurement surface with a true spherical shape. Accordingly, by eliminating the assembly error from the measured value of the measuring object, it is possible to perform shape measurement with higher accuracy.

Moreover, according to the embodiments of the present invention, it is possible, as described above, to perform measurement regardless of the shape (protrusion or recess) of the measurement surface. Accordingly, it is possible, for example, to measure a processing plate used for manufacturing a polished glass lens and measure the polished lens manufactured using the processing plate, on a same apparatus. Accordingly, it is possible to perform, with good accuracy, relative evaluation of both measurement results by eliminating an error caused by individual difference existing in different measurement apparatuses.

Although, in the above-described embodiments, the shape of the spherical measurement surface 21 is measured three-dimensionally, it is also possible for the shape measurement apparatus 1 to perform two-dimensional measurement on the shape of a curved surface, such as a side surface (outer periphery or inner peripheral surface) of a cylinder. In this case, the θ-stage 8 may be omitted.

Modification

Next, a modification of the embodiments of the present invention will be described. While the above-described embodiments are directed to measuring the shape of a spherical measurement surface of a measuring object, it is also possible for the shape measurement apparatus 1 illustrated in FIG. 1 to measure the amount of eccentricity of the outer periphery with respect to the measurement surface of the measuring object.

Figure 16:
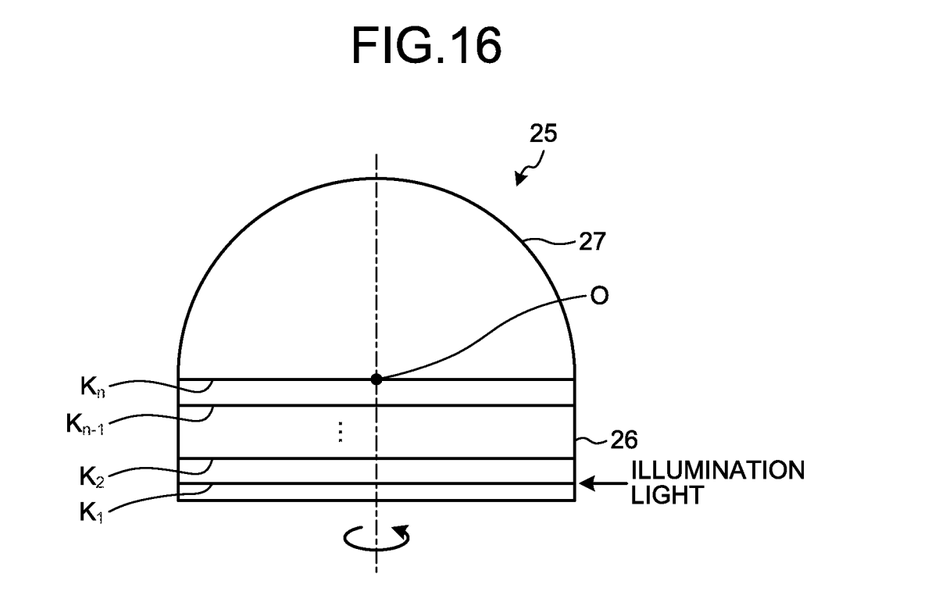
FIG. 16 is a schematic diagram for illustrating a method for measuring the amount of eccentricity.

In the modification, a method for measuring the amount of eccentricity would be executed after step S19 illustrated in FIG. 5, or later, that is, after determination is performed such that the spherical center position of the measurement surface of the measuring object matched the rotational center C of the sensor 7 (refer to FIG. 1). FIG. 16 is a schematic diagram for illustrating a method for measuring the amount of eccentricity.

First, an outer periphery 26 of a measuring object 25 is measured on the shape measurement apparatus 1. Specifically, a circumference $K_1$ is scanned by rotating the θ-stage 8 by one rotation in a state where illumination light is emitted onto a point on the circumference $K_1$ of the outer periphery 26 of the measuring object 25. Subsequently, the Z-stage 11 is driven to shift the illumination point of the illumination light, and a circumference $K_2$ is scanned by rotating the θ-stage 8 by one rotation in a state where the illumination light is emitted onto a point of the circumference $K_2$. Similarly, the distance between the point on each of circumferences $K_1$ to $K_n$ and the sensor 7 is measured by repeating scanning by illumination light toward circumferences $K_3$ to $K_n$.

Subsequently, the calculation unit 142 calculates the amount of eccentricity of the outer periphery 26 with respect to a measurement surface 27, that is, the amount of shift as deviation in the X-Y direction, and the amount of tilt as the amount of inclination of the outer periphery on the basis of the measured value of the outer periphery 26 of the measuring object 25 and the data obtained in step S18.

According to some embodiments, there are provided a sensor rotation mechanism configured to rotate, around a first axis, a sensor for performing non-contact measurement of a distance between the sensor and a measurement surface to output a measured value, and a sensor movement mechanism configured to move the sensor along a second axis orthogonal to the first axis so as to be movable across an intersection of the second axis with the first axis. A spherical center position of a measurement surface matches with the intersection of the second axis with the first axis. With this configuration, it is possible to set the distance between the sensor and the measurement surface to a fixed distance regardless of curvature of the measurement surface, and thus, to perform high-accuracy shape measurement with a reduced error in accordance with a measurement distance on the sensor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A shape measurement apparatus for measuring a shape of a measurement surface of a measuring object, the measurement surface having a spherical shape, the shape measurement apparatus comprising:
   a holder configured to hold the measuring object;
   a sensor configured to emit light onto the measurement surface to perform non-contact measurement of a distance between the sensor and the measurement surface and output a measured value;
   a sensor rotation mechanism configured to rotate the sensor around a first axis;
   a sensor movement mechanism configured to move the sensor along a second axis orthogonal to the first axis so as to be movable across an intersection of the second axis with the first axis;
   a holder movement mechanism configured to move the holder along a third axis parallel to a vertical direction and configured to move the holder on a plane orthogonal to the third axis; and
   a control device configured to:
      calculate the shape of the measurement surface based on the measured value output from the sensor;
      calculate a spherical center position of the measurement surface; and
      control the holder movement mechanism so as to match the spherical center position with the intersection of the second axis with the first axis.

2. The shape measurement apparatus according to claim 1,
   wherein a position of the sensor on the second axis is adjustable in accordance with a global shape of the measurement surface.

3. The shape measurement apparatus according to claim 1, further comprising a holder rotation mechanism configured to rotate the holder around the third axis.

4. The shape measurement apparatus according to claim 1,
   wherein the control device is configured to:
      calculate an assembly error on the shape measurement apparatus from a measured value obtained by measuring, by the sensor, a master having a true spherical surface on at least a part of a surface of the master; and
      correct the measured value of the measurement surface output from the sensor, using the assembly error.

5. The shape measurement apparatus according to claim 1,
   wherein the control device comprises a storage unit configured to store information on angular characteristics of the light emitted by the sensor, the information on the angular characteristics being obtained previously in relation to the shape measurement apparatus, and
   the control device is configured to correct an error of the measured value due to an illumination angle of the light emitted onto the measurement surface, based on at least an amount of rotation of the sensor around the first axis, using the information on the angular characteristics.

6. The shape measurement apparatus according to claim 1,
   wherein the control device comprises a storage unit configured to store information on a measurement distance obtained previously in relation to the shape measurement apparatus, and
   the control device is configured to correct an error of the measured value due to the distance between the sensor and the measurement surface using the information on the measurement distance.

7. The shape measurement apparatus according to claim 1, further comprising a temperature measurement instrument configured to measure ambient temperature of the shape measurement apparatus, wherein the control device comprises a storage unit configured to store information on temperature characteristics obtained previously in relation to the shape measurement apparatus, and the control device is configured to correct an error of the measured value due to a change in temperature using the information on the temperature characteristics.

8. The shape measurement apparatus according to claim 1, wherein the control device is configured to calculate an amount of eccentricity of an outer periphery of the measuring object with respect to the measurement surface, based on the measured value of the measurement surface and a measured value of the outer periphery of the measuring object, the measurement surface and the outer periphery being measured by the sensor.

9. A method for measuring, using a shape measurement apparatus, a shape of a measurement surface of a measuring object, the measurement surface having a spherical shape, the shape measurement apparatus comprising:

a holder configured to hold the measuring object;

a sensor configured to emit light onto the measurement surface to perform non-contact measurement of a distance between the sensor and the measurement surface and output a measured value;

a sensor rotation mechanism configured to rotate the sensor around a first axis;

a sensor movement mechanism configured to move the sensor along a second axis orthogonal to the first axis so as to be movable across an intersection of the second axis with the first axis; and a holder movement mechanism configured to move the holder along a third axis parallel to a vertical direction and configured to move the holder on a plane orthogonal to the third axis, the method comprising:

calculating the shape of the measurement surface based on the measured value output from the sensor;

calculating a spherical center position of the measurement surface; and causing the holder movement mechanism to match the spherical center position with the intersection of the second axis with the first axis.

10. The method according to claim 9, further comprising adjusting a position of the sensor on the second axis in accordance with a global shape of the measurement surface.

11. The method according to claim 9, further comprising:

measuring, by the sensor, a true spherical surface of a master having the true spherical surface on at least a part of a surface of the master and then outputting a measured value;

calculating an assembly error on the shape measurement apparatus based on the measured value of the master; and correcting the measured value of the measurement surface output from the sensor, using the assembly error.

12. The method according to claim 9, further comprising correcting an error of the measured value due to an illumination angle of the light emitted onto the measurement surface, based on at least an amount of rotation of the sensor around the first axis, using information on angular characteristics of the light emitted by the sensor, the information on the angular characteristics being obtained previously in relation to the shape measurement apparatus.

13. The method according to claim 9, further comprising correcting an error of the measured value due to the distance between the sensor and the measurement surface, using information on a measurement distance obtained previously in relation to the shape measurement apparatus.

14. The method according to claim 9, further comprising correcting an error of the measured value due to a change in ambient temperature of the shape measurement apparatus, using information on temperature characteristics obtained previously in relation to the shape measurement apparatus.

15. The method according to claim 9, further comprising calculating an amount of eccentricity of an outer periphery of the measuring object with respect to the measurement surface, based on the measured value of the measurement surface and a measured value of the outer periphery of the measuring object, the measurement surface and the outer periphery being measured by the sensor.

* * * * *